US012597322B1

(12) United States Patent
Rodriguez Bravo

(10) Patent No.: US 12,597,322 B1
(45) Date of Patent: Apr. 7, 2026

(54) DYNAMIC TRIGGERING OF SIMULATED ERRORS IN AUTOMATED TELLER MACHINES

(71) Applicant: Kyndryl, Inc., New York, NY (US)

(72) Inventor: Cesar Augusto Rodriguez Bravo, Alajuela (CR)

(73) Assignee: Kyndryl Inc., New York, NY (US)

( * ) Notice: Subject to any disclaimer, the term of this patent is extended or adjusted under 35 U.S.C. 154(b) by 0 days.

(21) Appl. No.: 19/011,689

(22) Filed: Jan. 7, 2025

(51) Int. Cl.
*G07F 19/00* (2006.01)
*G06Q 20/40* (2012.01)

(52) U.S. Cl.
CPC ....... *G07F 19/206* (2013.01); *G06Q 20/4012* (2013.01)

(58) Field of Classification Search
CPC .......................... G07F 19/206; G06Q 20/4012
See application file for complete search history.

(56) References Cited

U.S. PATENT DOCUMENTS

| | | | |
|---|---|---|---|
| 7,004,387 B1 | 2/2006 | Kaimikaua et al. | |
| 8,260,720 B1 | 9/2012 | Dixon et al. | |
| 11,429,725 B1 | 8/2022 | Banerjee | |
| 11,694,201 B2 | 7/2023 | Wright et al. | |
| 2009/0201372 A1 | 8/2009 | O'Doherty et al. | |
| 2017/0069051 A1 | 3/2017 | Pettit, Sr. et al. | |
| 2019/0052661 A1* | 2/2019 | Anand .................. | H04L 63/083 |
| 2020/0111099 A1 | 4/2020 | Benkreira et al. | |

FOREIGN PATENT DOCUMENTS

| | | |
|---|---|---|
| CN | 1480905 A | 3/2004 |
| IN | 1093/CHE/2014 | 8/2016 |
| WO | 2001071674 | 9/2001 |

OTHER PUBLICATIONS

Mell et al., "The NIST Definition of Cloud Computing", NIST, Special Publication 800-145, Sep. 2011, 7 pages.
Anonymous, "Express kidnapping", https://en.wikipedia.org/wiki/Express_kidnapping, Wikipedia, Accessed Jan. 3, 2025, 1 page.

* cited by examiner

*Primary Examiner* — Jamara A Franklin
(74) *Attorney, Agent, or Firm* — Erik Swanson; Andrew D. Wright; Calderon Safran & Wright P.C.

(57) ABSTRACT

A method includes: receiving input from a user, the input defining a true personal identification number (PIN) associated with the user and at least one false PIN associated with the user; in response to the user initiating a transaction at an automated teller machine (ATM), determining whether a PIN associated with the transaction matches the true PIN associated with the user or the at least one false PIN associated with the user; and based on the determining, performing one of: in response to the PIN associated with the transaction matching the true PIN associated with the user, permitting the ATM to continue with the transaction; or in response to the PIN associated with the transaction matching the at least one false PIN associated with the user, causing the ATM to exhibit a simulated error that prevents the transaction.

17 Claims, 6 Drawing Sheets

┌─ 802
Receive input from a user, the input defining a true personal identification number (PIN) associated with the user and at least one false PIN associated with the user ┌─ 804
In response to the user initiating a transaction at an automated teller machine (ATM), determine whether a PIN associated with the transaction matches the true PIN associated with the user or the at least one false PIN associated with the user ┌─ 806
Based on the determining, perform one of: in response to the PIN associated with the transaction matching the true PIN associated with the user, permit the ATM to continue with the transaction; or in response to the PIN associated with the transaction matching the at least one false PIN associated with the user, cause the ATM to exhibit a simulated error that prevents the transaction

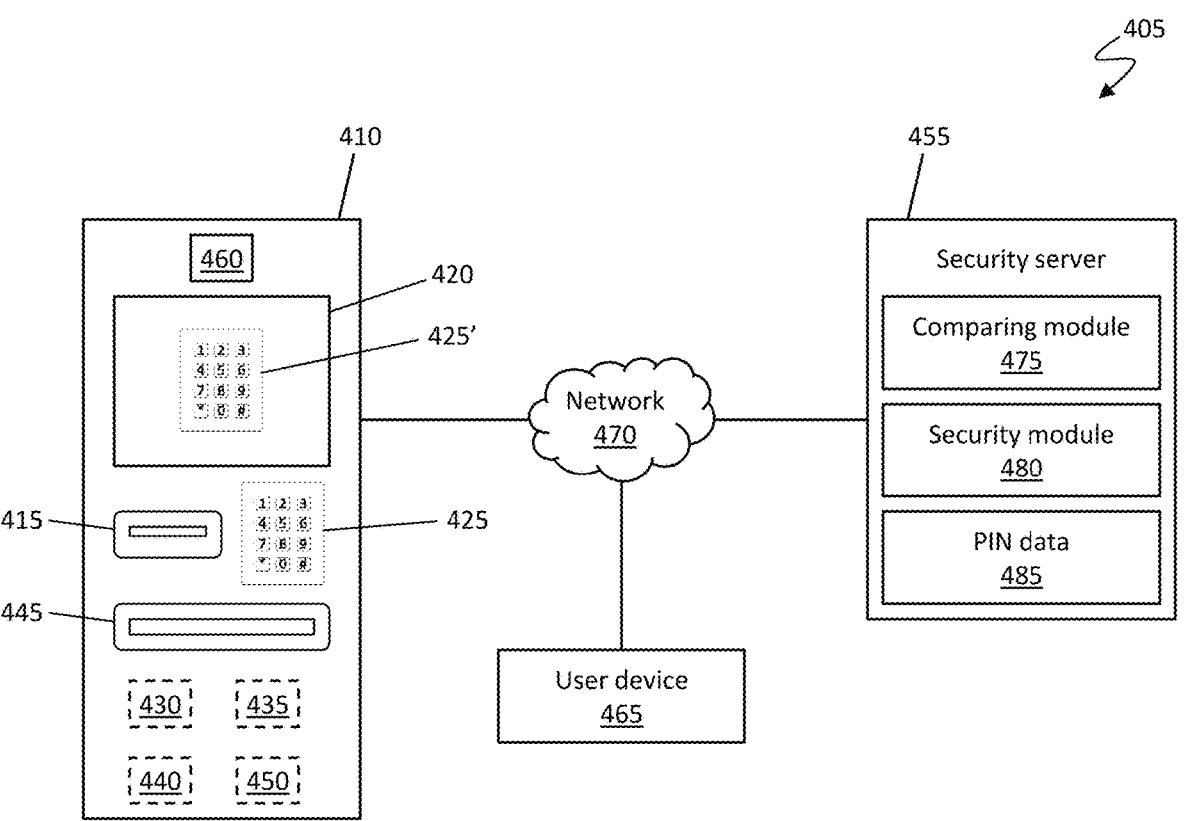
FIG. 4
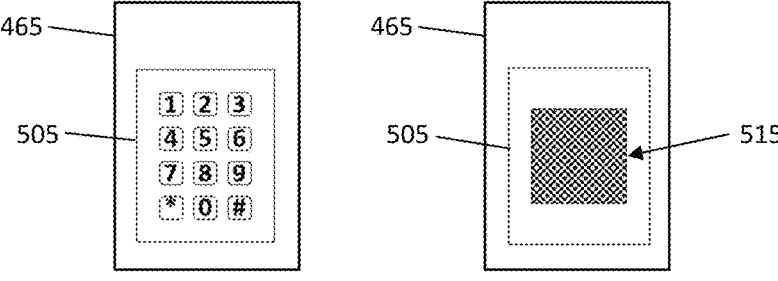
FIG. 5A          FIG. 5B

DYNAMIC TRIGGERING OF SIMULATED ERRORS IN AUTOMATED TELLER MACHINES

BACKGROUND

Aspects of the present invention relate generally to electronic device security and, more particularly, to automated teller machine (ATM) security.

An ATM is a financial automation device by which account holders may access their account to perform transactions, such as deposit, withdraw, and transfer funds. An ATM typically requires a user to authenticate themselves to the ATM via a personal identification number (PIN). In one example, a user accesses their account via an ATM by inserting a card (e.g., a credit card or an ATM card) into the ATM and then entering their PIN via a keypad or touch-screen on with the ATM. In another example, a user accesses their account via an ATM by entering their PIN in an application on their mobile computing device and scanning at the ATM a quick-response (QR) code displayed on their mobile computing device.

SUMMARY

In a first aspect of the invention, there is a computer-implemented method including: receiving input from a user, the input defining a true personal identification number (PIN) associated with the user and at least one false PIN associated with the user; in response to the user initiating a transaction at an automated teller machine (ATM), determining whether a PIN associated with the transaction matches the true PIN associated with the user or the at least one false PIN associated with the user; and based on the determining, performing one of: in response to the PIN associated with the transaction matching the true PIN associated with the user, permitting the ATM to continue with the transaction; or in response to the PIN associated with the transaction matching the at least one false PIN associated with the user, causing the ATM to exhibit a simulated error that prevents the transaction.

In another aspect of the invention, there is a computer program product including one or more computer readable storage media having program instructions collectively stored on the one or more computer readable storage media. The program instructions are executable to: receive input from a user, the input defining a true personal identification number (PIN) associated with the user and at least one false PIN associated with the user; in response to the user initiating a transaction at an automated teller machine (ATM), determine whether a PIN associated with the transaction matches the true PIN associated with the user or the at least one false PIN associated with the user; and based on the determining, perform one of: in response to the PIN associated with the transaction matching the true PIN associated with the user, permit the ATM to continue with the transaction; in response to the PIN associated with the transaction matching the at least one false PIN associated with the user, cause the ATM to exhibit a simulated error that prevents the transaction; or in response to the PIN associated with the transaction matching neither the true PIN associated with the user nor the at least one false PIN associated with the user, cause the ATM to cancel the transaction.

In another aspect of the invention, there is system including a processor, a computer readable memory, one or more computer readable storage media, and program instructions collectively stored on the one or more computer readable storage media. The program instructions are executable to: receive input from a user, the input defining a true personal identification number (PIN) associated with the user and at least one false PIN associated with the user; in response to the user initiating a transaction at an automated teller machine (ATM), determine a PIN associated with the transaction matches the at least one false PIN associated with the user; and based on the determining, cause the ATM to exhibit a simulated error that prevents the transaction and perform one or more security actions in addition to causing the ATM to exhibit the simulated error.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 4 shows a block diagram of an exemplary system in accordance with aspects of the invention.

FIGS. 5A and 5B show examples of a user interface in accordance with aspects of the invention.

DETAILED DESCRIPTION

Figure 1:
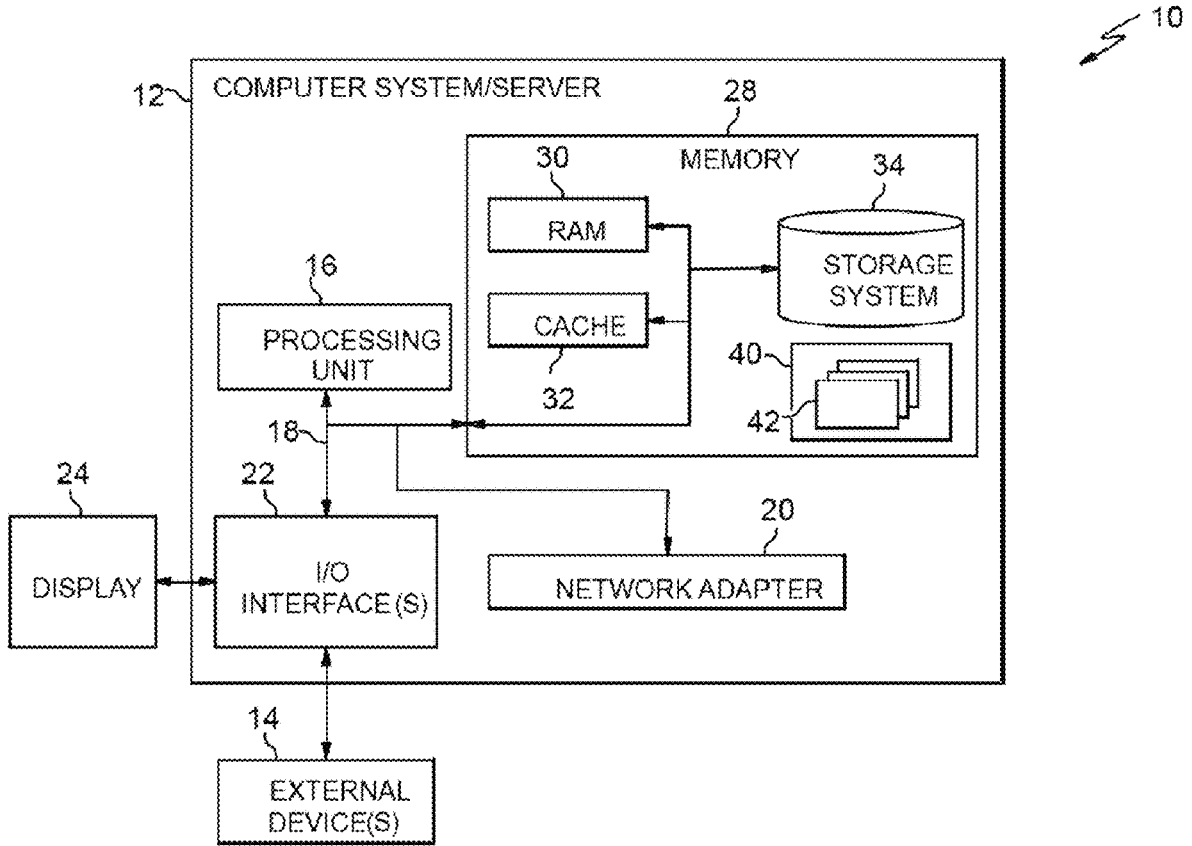
FIG. 1 depicts a cloud computing node according to an embodiment of the present invention.

Aspects of the present invention relate generally to electronic device security and, more particularly, to ATM security. ATM fraud is a persistent problem that costs banks and individuals billions of dollars each year. ATM fraud can take many forms including, but not limited to, card skimming, card cloning, card hacking, and coerced withdrawals. Coerced withdrawals are a particular type of ATM fraud in which an account holder is forced against their will to withdraw funds from their account via an ATM. The coercion often comes via threat of physical harm to the account holder or another person. A particular example is "express kidnapping" which refers to an abduction of a victim in which an immediate ransom is demanded from the victim by forcing the victim to withdraw money from an ATM.

Some systems and methods directed to dealing with the problem of coerced withdrawals involve automatically alerting law enforcement, activating security cameras, and closing and locking doors of a room containing an ATM in response to a user entering a special code into the ATM. Automatically alerting law enforcement does not solve the problem because the victim may still be forced to withdraw money from the ATM before law enforcement can intervene in the coerced withdrawal. Activating security cameras also does not prevent the coerced withdrawal from occurring, but instead only provides evidence of persons involved, with such evidence being of use only after the coerced withdrawal. Closing and locking doors of a room containing the ATM may put the victim of the coerced withdrawal in danger by locking the victim in the room with the bad actor that is perpetrating the coerced withdrawal. None of these solutions provide an adequate solution to the problem of coerced withdrawals at ATMs.

Implementations of the invention provide an improvement in the technology of ATM security by providing a technical solution to the problem of coerced withdrawals at ATMs. In embodiments, the technical solution includes receiving input from a user wherein the input defines a true PIN associated with the user and a false PIN associated with the user, causing an ATM to permit normal access to an account associated with the user in response to the user entering the true PIN when authenticating for access to the ATM, and causing the ATM to exhibit a simulated error that prevents the withdrawal of money in response to the user entering the false PIN when authenticating for access to the ATM. By causing the ATM to exhibit a simulated error in response to the user entering their false PIN, embodiments give the appearance that the user is attempting to legitimately access their account but that the ATM is experiencing an error that is outside the control of the user and that prevents a withdrawal of money. In this manner, a user who is a victim of a coerced withdrawal can give the outward appearance of attempting to comply with the coerced withdrawal while secretly causing the ATM to prevent withdrawal of money from the user's account.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
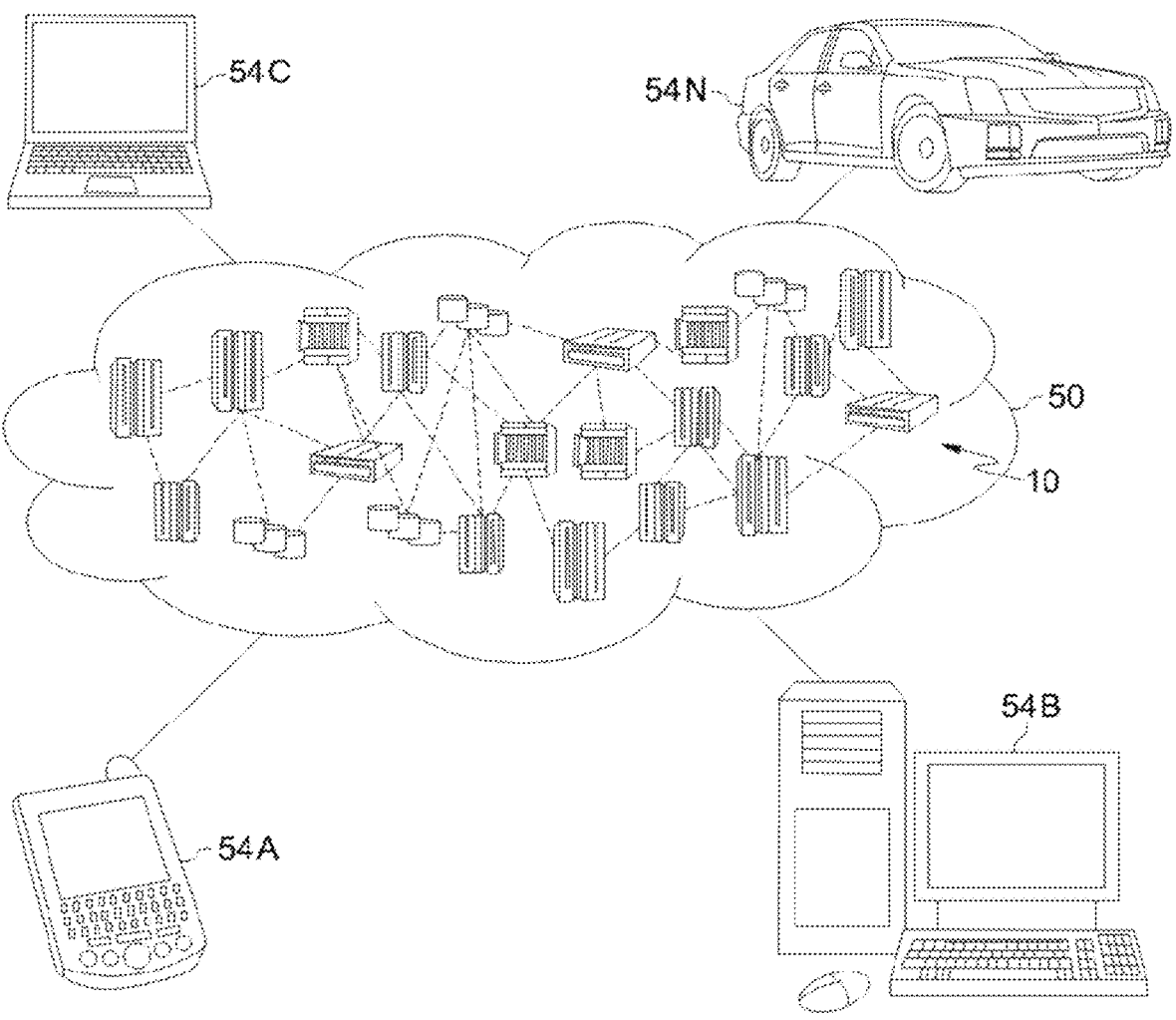
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
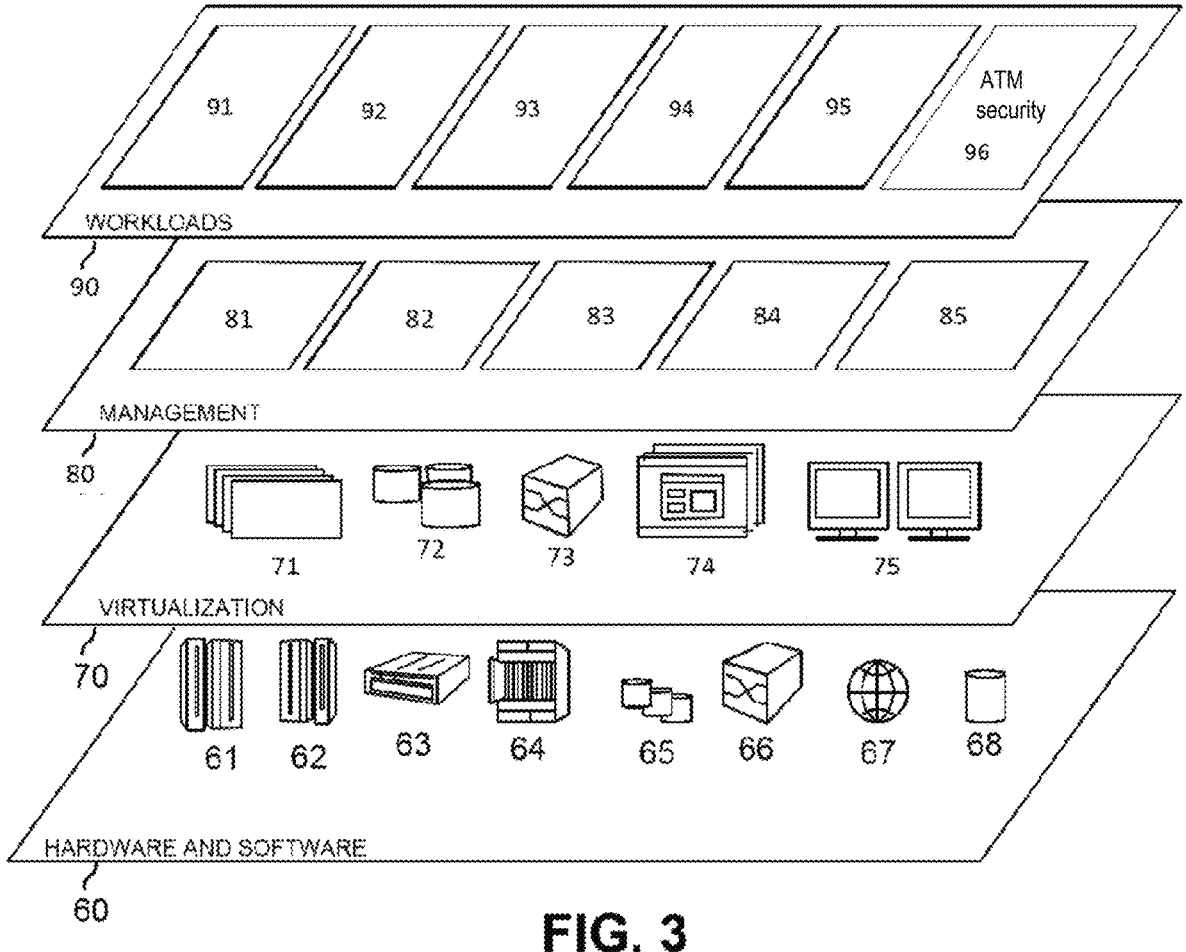
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ATM security 96.

Implementations of the invention may include a computer system/server 12 of FIG. 1 in which one or more of the program modules 42 are configured to perform (or cause the computer system/server 12 to perform) one of more functions of the ATM security 96 of FIG. 3. For example, the one or more of the program modules 42 may be configured to: receive input from a user, the input defining a true personal identification number (PIN) associated with the user and at least one false PIN associated with the user; in response to the user initiating a transaction at an automated teller machine (ATM), determine whether a PIN associated with the transaction matches the true PIN associated with the user or the at least one false PIN associated with the user; and based on the determining, perform one of: in response to the PIN associated with the transaction matching the true PIN associated with the user, permit the ATM to continue with the transaction; in response to the PIN associated with the transaction matching the at least one false PIN associated with the user, cause the ATM to exhibit a simulated error that prevents the transaction; or in response to the PIN associated with the transaction matching neither the true PIN associated with the user nor the at least one false PIN associated with the user, cause the ATM to cancel the transaction.

FIG. 4 shows a block diagram of an exemplary system 405 in accordance with aspects of the invention. As shown in FIG. 4, the system 405 includes a machine 410 that may include a card insertion portion 415 where a user inserts a card to initiate a transaction with the machine 410. In various implementations the machine 410 is an ATM and the card comprises an ATM card, credit card, or debit card, any of which may comprise a magnetic stripe card or a chip card. In embodiments, the machine 410 includes a display 420, such as a liquid-crystal display (LCD), that is configured to display information visually to a user of the machine 410. In some embodiments, the machine 410 includes a keypad 425/425' that a user may utilize to provide input to the machine 410. In one example, the keypad 425 includes plural physical buttons that a user of the machine 410 utilizes to enter their PIN for authenticating themselves to the machine 410. In another example, the display 420 is a touchscreen display on which a keypad 425' is displayed and by which a user may provide touchscreen input to enter their PIN for authenticating themselves to the machine 410. The machine 410 may include a computer processor 430, computer memory 435, and computer operating system 440 that are configured to perform functions such as controlling of what information is displayed on the display 420, processing inputs received from via the keypad 425/425', receiving deposits, and dispensing cash via a cash dispensing system 445. In various embodiments, the machine 410 includes a communication interface 450 that is configured to provide network communication with other computing devices such as security server 455.

In some embodiments, the machine 410 includes a camera 460 that is configured to visually scan a QR code, bar code, or similar authentication information displayed on a display screen of a mobile computing device such as user device 465. In embodiments, the user device 465 comprises a mobile computing device, such as a smartphone or tablet computer, and may include one or more elements of the computer system/server 12 of FIG. 1.

In accordance with additional aspects of the invention, and with continued reference to FIG. 4, the system 405 includes a security server 455 that communicates with the machine 410 via a network 470. In one example, the security server 455 comprises one or more computing devices such as one or more instances of the computer system/server 12 of FIG. 1. In another example, the security server 455 comprises one or more virtual machines and/or one or more containers running on one or more computing devices such as one or more instances of the computer system/server 12 of FIG. 1.

In various embodiments, the network 470 comprises one or more networks that provide communication between computing devices. For example, the network 470 may include one or more LANs, one or more WANs, the Internet, or any combination thereof. In a particular exemplary implementation, the machine 410 and the security server 455 are nodes in a cloud computing environment (e.g., such as nodes 10 in the cloud computing environment 50 of FIG. 2) and the user device 465 is a local computing device in the cloud computing environment.

In embodiments, the security server 455 comprises a comparing module 475 and a security module 480, each of which may comprise one or more program modules such as program modules 42 described with respect to FIG. 1. The security server 455 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Although FIG. 4 shows an embodiment in which the machine 410 and security server 455 are different components that communicate via the network 470, implementations are not limited to a system in which the machine 410 communicates with a server via a network in order to perform the operations described herein. Instead, in an alternative embodiment, operations described herein as being performed by the security server 455 may be performed by the machine 410, for example, by running the comparing module 475 and the security module 480 on the machine 410.

In accordance with aspects of the invention, the comparing module 475 is configured to receive a PIN associated with a transaction initiated by a user at the machine 410, and to determine whether the PIN associated with the transaction matches a true PIN associated with the user, whether the PIN associated with the transaction matches at least one false PIN associated with the user, or whether the PIN associated with the transaction matches neither the true PIN associated with the user nor the at least one false PIN associated with the user.

In embodiments, in response to a user initiating a transaction at the machine 410, the machine 410 communicates a user identifier (user ID) associated with the user and a PIN associated with the transaction to the security server 455 via the network 470. In embodiments, the security server 455 stores or has access to PIN data 485 that defines: each respective user of the system using a unique user ID, such as a username or account number; a true PIN associated with each user via the user ID; and at least one false PIN associated with each user via the user ID. The true PIN associated with a user may comprise a numeric code or an alpha-numeric code that is selected by the user. The at least one false PIN associated with a user may comprise a numeric code or an alpha-numeric code that is selected by the user and that is different than the true PIN associated with the same user. In an exemplary implementation, the true PIN associated with a user is intended for use in normal situations, and the at least one false PIN associated with the user is intended for use when the user is under duress, such as in a coerced withdrawal situation. In embodiments, in response to receiving a user ID and a PIN associated with the transaction, the comparing module 475 uses the PIN data 485 to compare the PIN associated with the transaction to the true PIN associated with the user and to the at least one false PIN associated with the same user. Based on this comparing, the comparing module 475 determines that the PIN associated with the transaction matches the true PIN associated with the user, that the PIN associated with the transaction matches the at least one false PIN associated with the user, or that the PIN associated with the transaction matches neither the true PIN associated with the user nor the at least one false PIN associated with the user.

The user ID and the PIN associated with the transaction may be received by the system in various ways. In one example, a user initiates a transaction with the machine 410 by inserting their card into the card insertion portion 415. In this example, in response to this initiating of the transaction, the machine 410 prompts the user (e.g., via a message displayed on the display 420) to enter a PIN, which the user enters via the keypad 425/425'. In this example, the PIN entered via the keypad 425/425' is the PIN associated with the transaction. In this example, the user ID is encoded on the card (e.g., in a magnetic stripe or a chip in the card) and the machine 410 obtains the user ID from the card.

In another example, a user initiates a transaction with the machine 410 using an application on their user device 465. In this example, in response to the user initiating the transaction, the application on the user device 465 prompts the user to enter a PIN via the application. FIG. 5A shows an example of the user device 465 displaying a user interface 505 of the application, the user interface 505 including a keypad by which the user may enter a PIN in this manner. In this example, the PIN entered via the application on the user device 465 is the PIN associated with the transaction. Continuing this example, in response to the user entering the PIN associated with the transaction, the user device 465 communicates the user ID and the PIN associated with the transaction to the machine 410. FIG. 5B shows an example of the user device 465 displaying the user interface 505 of the application with a code 515 (e.g., a QR code or bar code) that is encoded with the user ID and the PIN associated with the transaction. In embodiments, the application on the user device 465 may generate the code and cause the user device 465 to display the code 515. The machine 410 may scan the code 515 using the camera 460 and decode the code 515 to determine the user ID and the PIN associated with the transaction.

In accordance with aspects of the invention and based on the determining performed by the comparing module 475, the security module 480 is configured to permit the machine 410 to continue with the transaction, cause the machine 410 to exhibit a simulated error that prevents the transaction, or cancel the transaction. In one example, in response to the comparing module 475 determining that the PIN associated with the transaction matches the true PIN associated with the user, the security module 480 sends a message to the machine 410 that causes the machine 410 to continue with the transaction in a normal manner, e.g., by permitting a withdrawal of cash and/or other account actions. In another example, in response to the comparing module 475 determining that the PIN associated with the transaction matches the at least one false PIN associated with the user, the security module 480 sends a message to the machine 410 that causes the machine 410 to exhibit a simulated error that prevents the transaction. In another example, in response to the comparing module 475 determining that the PIN associated with the transaction does not match the true PIN associated with the user and does not match the at least one false PIN associated with the user, the security module 480 sends a message to the machine 410 that causes the machine 410 cancel the transaction. Canceling the transaction may include, for example and without limitation, prompting the user to renter a PIN and/or ejecting the card from the card insertion portion 415 and displaying a default (e.g., welcome) screen that is displayed before a transaction is initiated.

The simulated error exhibited by the machine 410 may comprise, for example, and without limitation: the display 420 displaying a message indicating a network problem (e.g., "Network Unavailable") and canceling the transaction; the display 420 displaying a screen that indicates a system crash (e.g., a bluescreen), and the machine 410 keeping the user's card if a card was used; the machine 410 simulating that it is counting money (e.g., by running a motor in the cash dispensing system 445), followed by the machine 410 simulating a loss of electrical power, followed by the display 420 displaying the default (e.g., welcome) screen that is displayed before a transaction is initiated, and the machine 410 keeping the user's card if a card was used; the machine 410 simulating that it is counting money (e.g., by running a motor in the cash dispensing system 445), followed by the machine 410 simulating a mechanical malfunction (e.g., by stopping the running of the cash dispensing system 445 and/or by emitting a recorded noise that simulates a mechanical malfunction), followed by the display 420 displaying a message indicating a mechanical problem (e.g., "Cash Dispenser Jammed"), and the machine 410 keeping the user's card if a card was used; the display 420 displaying a message indicating an account associated with the user is frozen and suggesting the user contact their bank (e.g., "Account Frozen, Please Contact Your Bank"), and the machine 410 keeping the user's card if a card was used; and the display 420 displaying a message indicating the machine 410 does not have sufficient cash to complete the transaction ("Machine Has Insufficient Funds").

In accordance with aspects of the invention, the security module 480 stores data defining plural different simulated errors that the machine 410 is configured to exhibit. In embodiments, a user is permitted to select one of the plural different errors to associate with the false PIN associated with the user. In one example, the selection may be made during a setup or configuration step associated with the user's account and via a user interface of an application that communicates with the security server 455. The application may run on the user device 465 or another user computing device. In this example, the user may also utilize the user interface of the application to provide input that defines the true PIN associated with the user and the false PIN associated with the user. The true PIN associated with the user, the false PIN associated with the user, and the simulated error selected by the user to be associated with the false PIN associated with the user may be stored in the PIN data 485 and may be linked to one another via the user ID associated with the user.

In some embodiments, a user may define one true PIN and plural different false PINs, where each one of the plural false PINs is associated with a different one of plural simulated errors that the machine 410 is configured to exhibit (e.g., via user selection). In this manner, when under duress, a user may wish to enter a particular one of their plural different false PINs depending on the situation with which they are faced in order to cause the machine 410 to exhibit a particular one of the simulated errors. In these embodiments, the true PIN associated with the user, the plural false PINs associated with the user, and the simulated errors selected by the user to be associated with respective ones of the plural false PINs associated with the user may be stored in the PIN data 485 and may be linked to one another via the user ID associated with the user.

With continued reference to FIG. 4, in accordance with further aspects of the invention, the security module 480 is configured to perform one or more security actions in addition to causing the machine 410 to exhibit a simulated error. In one example, the one or more security actions include disabling other types of transactions involving the account of the user. In this example, in response to the PIN associated with the transaction matching at least one false PIN associated with the user, the security module 480 temporarily disables other types of transactions involving the account of the user. For example, the transaction initiated at the machine may be a first type of transaction (e.g., a withdrawal of money from the user's account), and the security module 480 may temporarily disable a second type of transaction (e.g., a transfer or money from the user's account to another person's account). The security module 480 may cause this disabling for a predefined amount of time or until a predefined event occurs (e.g., the user enters their true PIN).

In another example, the one or more security actions include monitoring a location of the user and reporting the location of the user to a predefined contact. In this example, in response to the PIN associated with the transaction matching at least one false PIN associated with the user, the security module 480 determines a location of the user from the user device 465 (e.g., via a location-determining system in the user device 465), and reports the location of the user to a predefined contact (e.g., law enforcement, a relative, etc.). In this example, the security module 480 repeats the determining the location of the user and the reporting the location of the user until receiving a predefined input from the user (e.g., the user entering their true PIN in an application on the user device 465).

Figure 6:
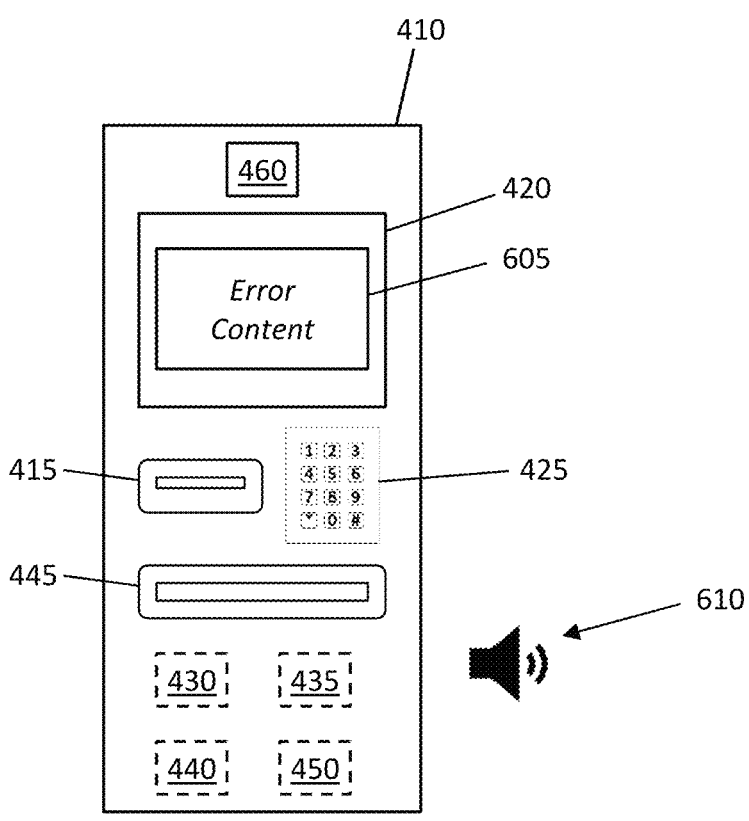
FIG. 6 shows an exemplary use case of a machine exhibiting a simulated error in accordance with aspects of the invention.

FIG. 6 shows an exemplary use case of the machine 410 exhibiting a simulated error. In various embodiments, the machine 410 exhibits a simulated error by performing one or more of: displaying error content 605 on the display 420; emitting a sound 610; and simulating a shutdown of the machine 410. In embodiments, the error content 605 may indicate various different types of errors including but not limited to: a network error (e.g., "Network Unavailable"); a system crash (e.g., a bluescreen that may be blank or may include text indicating a system crash); a mechanical malfunction (e.g., "Cash Dispenser Jammed"); an error with the user's account (e.g., "Account Frozen, Please Contact Your Bank"); or a cash availability error with the machine 410 ("Machine Has Insufficient Funds"). In embodiments, the sound 610 may simulate different types of errors including but limited to: a sound of the cash dispensing system 445 running but no cash being dispensed; or a sound that simulates a mechanical malfunction (e.g., the sound of a physical component jamming or breaking). In one example, the sound 610 is a recorded or stored sound emitted by a speaker in the machine 410. In another example, the machine 410 emits the sound by running a motor of the cash dispensing system 445 without dispensing any cash. In embodiments, simulating a shutdown of the machine may include but is not limited to: causing the display 420 to go blank and stay blank; or causing the display 420 to go blank then display a default or welcome screen.

Figure 7:
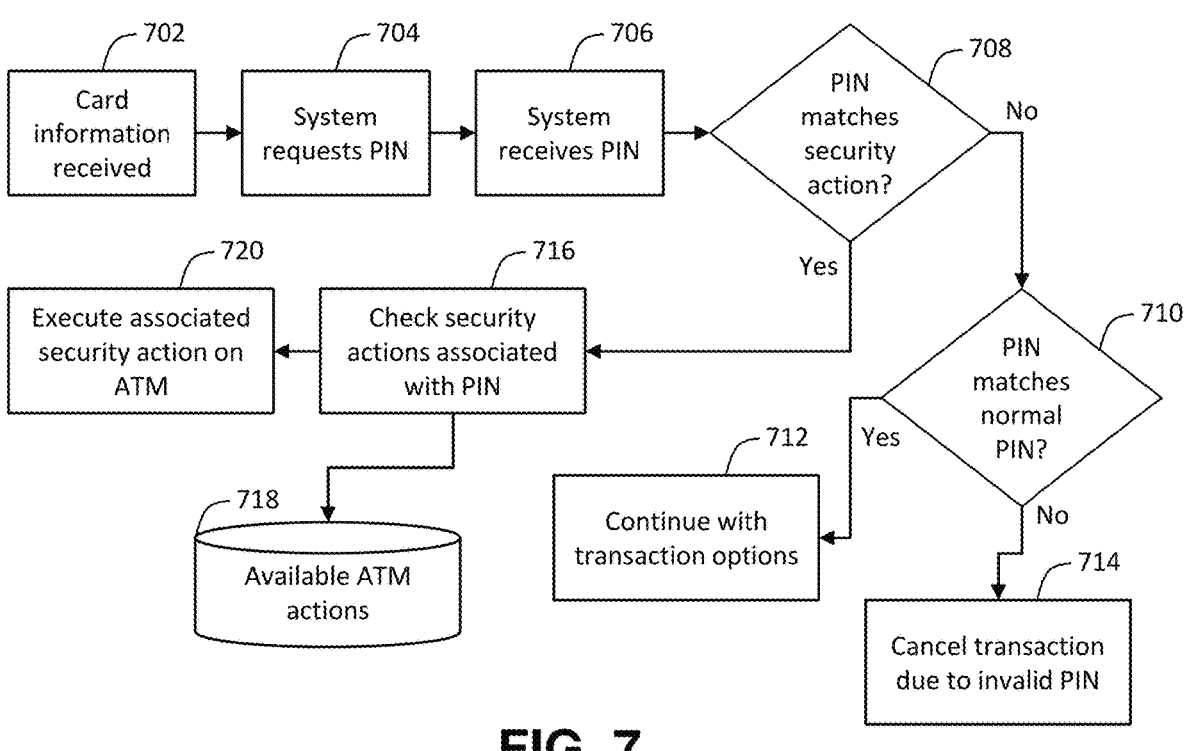
FIG. 7 shows a flowchart of an exemplary method in accordance with aspects of the invention.

FIG. 7 shows a flowchart of an exemplary method in accordance with aspects of the present invention. Operations of the method may be carried out in the environment of FIG. 4 and are described with reference to elements depicted in FIG. 4.

At operation 702, card information is received at the machine 410, e.g., via a user inserting their card into the card insertion portion 415 as part of initiating a transaction with the machine 410. The card information may include a user ID associated with the user, the user ID being encoded on the card such as via a magnetic stripe or a chip.

At operation 704, the system requests the user's PIN. In embodiments, in response to receiving the card, the machine 410 prompts the user to enter their PIN.

At operation 706, the system receives the PIN. In embodiments, the user enters a PIN via the keypad 425/425' of the machine 410. In embodiments, the PIN entered at operation 706 is the PIN associated with the transaction.

At operation 708, the system determines whether the PIN entered at operation 706 (i.e., the PIN associated with the transaction) matches a security action. In embodiments, the comparing module 475 receives the user ID and the PIN associated with the transaction from the machine 410 and, based on the user ID, obtains from the PIN data 485 the at least one false PIN associated with this user. The comparing module 475 compares the PIN associated with the transaction to the at least one false PIN associated with this user to determine if they match (i.e., are the same PIN). In the event the PIN associated with the transaction does not match the at least one false PIN associated with this user, then at operation 710 the system determines whether the PIN entered at operation 706 (i.e., the PIN associated with the transaction) matches a the normal PIN for this user.

In embodiments, at operation 710 the comparing module 475 obtains from the PIN data 485 the true PIN associated with this user based on the user ID. The comparing module 475 compares the PIN associated with the transaction to the true PIN associated with this user to determine if they match (i.e., are the same PIN). In the event the PIN associated with the transaction matches the true PIN associated with this user, then at operation 712 the system continues with normal transaction options for the user since the user has authenticated themselves to the machine 410 using their normal (i.e., non-duress) PIN. In the event the PIN associated with the transaction does not match the true PIN associated with this user at operation 710, then at operation 714 the system cancels the transaction sine the PIN entered by the user does not match true PIN of any false PIN associated with this user.

Referring back to operation 708, in the event the PIN associated with the transaction matches the at least one false PIN associated with this user, then at operation 716 the system determines the security action(s) associated with the PIN associated with the transaction. In embodiments, the security module 480 determines from the PIN data 485 a simulated error associated with the false PIN that matches the PIN associated with the transaction. As represented by block 718, the security module 480 may store data defining plural different simulated errors that the machine 410 is configured to exhibit. As described previously, a user may be permitted to select one of the plural different simulated errors to associate with a false PIN associated with the user, for example, during a setup or configuration step. An association between selected simulated error and the false PIN associated with the user may be stored in the PIN data 485 with the user ID of this user.

At operation 720, the system executes the associated security action on the machine 410. In embodiments, the security module 480 transmits a message (e.g., instruction) to the machine 410 that causes the machine to exhibit the simulated error that is associated with the false PIN that matches the PIN associated with the transaction. As described previously, the security module 480 may cause the machine 410 exhibits a simulated error by sending a message that causes the machine 410 to perform one or more of: display error content on the display 420; emit a sound that simulates a malfunction; and simulate a shutdown of the machine 410.

Figure 8:
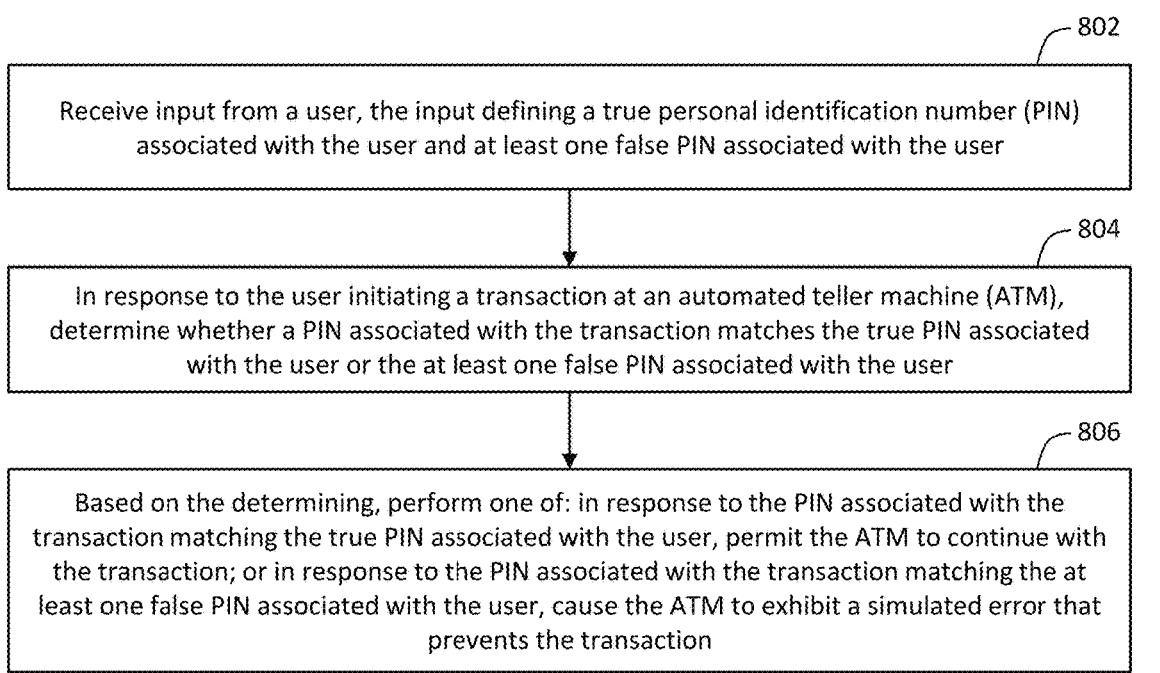
FIG. 8 shows a flowchart of an exemplary method in accordance with aspects of the invention.

FIG. 8 shows a flowchart of an exemplary method in accordance with aspects of the present invention. Operations of the method may be carried out in the environment of FIG. 4 and are described with reference to elements depicted in FIG. 4.

At operation 802, the system receives input from a user, wherein the input defines a true personal identification number (PIN) associated with the user and at least one false PIN associated with the user. In embodiments, and as described with respect to FIG. 4, the user provides input (e.g., via the user device 465 or another computing device)

that defines the true PIN and at least one false PIN for this user. The input may be received during a setup or configuration step of the user's account.

At operation 804, in response to the user initiating a transaction at an ATM, the system determines whether a PIN associated with the transaction matches the true PIN associated with the user or the at least one false PIN associated with the user. In embodiments, and as described with respect to FIG. 4, the user provides a PIN to the machine 410 as part of initiating a transaction at the machine 410. In embodiments, the comparing module 475 makes these determinations by comparing the PIN provided at the machine (i.e., the PIN associated with the transaction) to one or both of the true PIN associated with the user and the at least one false PIN associated with the user. Since the true PIN and each of the at least one false PINs differ from one another, the comparing can be stopped if and when a match is found.

At operation 806, based on the determining, the system performs one of: in response to the PIN associated with the transaction matching the true PIN associated with the user, permitting the ATM to continue with the transaction; or in response to the PIN associated with the transaction matching the at least one false PIN associated with the user, causing the ATM to exhibit a simulated error that prevents the transaction. In one example, in response to the comparing module 475 determining that the PIN associated with the transaction matches the true PIN associated with the user, the security module 480 sends a message to the machine 410 that causes the machine 410 to continue with the transaction in a normal manner, e.g., by permitting a withdrawal of cash and/or other account actions. In another example, in response to the comparing module 475 determining that the PIN associated with the transaction matches the at least one false PIN associated with the user, the security module 480 sends a message to the machine 410 that causes the machine 410 to exhibit a simulated error that prevents the transaction.

In embodiments of the method, the PIN associated with the transaction is input to the ATM via a keypad on the ATM.

In embodiments of the method, the PIN associated with the transaction is input via an application on a mobile computing device and communicated from the mobile computing device to the ATM. In one example, the PIN associated with the transaction is communicated from the mobile computing device to the ATM via a code that is displayed by the mobile computing device and scanned by a camera in the ATM.

In embodiments of the method, the PIN associated with the transaction matches the at least one false PIN associated with the user, and the causing the ATM to exhibit the simulated error comprises one of: causing the ATM to display a message that indicates a network error; causing the ATM to display a message that indicates a system crash of an operating system of the ATM; causing the ATM to emit a noise that simulates the ATM counting money and causing the ATM to simulate a loss of power and a reboot of the ATM; causing the ATM to emit a noise that simulates the ATM counting money and causing the ATM to display a message that indicates a money dispensing system of the ATM is malfunctioning; causing the ATM to display a message that indicates an account associated with the user is frozen and suggesting the user contact their bank; or causing the ATM to display a message that indicates the ATM does not have sufficient cash to complete the transaction.

In embodiments of the method, the PIN associated with the transaction matches the at least one false PIN associated with the user, the transaction is a first type of transaction involving an account associated with the user, and the method further comprises temporarily disabling a second type of transaction involving the account associated with the user, the second type of transaction being different than the first type of transaction.

In embodiments of the method, the PIN associated with the transaction matches the at least one false PIN associated with the user, and the method further comprises determining a location of the user from a mobile computing device associated with the user and reporting the location of the user to a predefined contact. In one example, the method comprises repeating the determining the location of the user and the reporting the location of the user until receiving a predefined input from the user via the mobile computing device.

In embodiments of the method, the at least one false PIN associated with the user comprises plural different false PINs associated with the user, the plural different false PINS associated with the user are associated with respective ones of plural different simulated errors, and the causing the ATM to exhibit the simulated error comprises causing the ATM to exhibit a particular one of the plural different simulated errors based on the PIN associated with the transaction matching a particular one of the plural different false PINs.

In embodiments, a service provider could offer to perform the processes described herein. In this case, the service provider can create, maintain, deploy, support, etc., the computer infrastructure that performs the process steps of embodiments of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Various embodiments of the invention provide a computer-implemented method, via a network. In this case, a computer infrastructure, such as computer system/server 12 (FIG. 1), can be provided and one or more systems for performing the processes of embodiments of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes embodiments of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving input from a user, the input defining a true personal identification number (PIN) associated with the user and at least one false PIN associated with the user;

in response to the user initiating a transaction at an automated teller machine (ATM), determining whether a PIN associated with the transaction matches the true PIN associated with the user or the at least one false PIN associated with the user; and based on the determining, and in response to the PIN associated with the transaction matching the at least one false PIN associated with the user, causing the ATM to exhibit a simulated error that prevents the transaction, determining a location of the user from a mobile computing device associated with the user, reporting the location of the user to a predefined contact, and repeating the determining the location of the user and the reporting the location of the user until receiving a predefined input from the user via the mobile computing device.

2. The computer-implemented method of claim 1, wherein the PIN associated with the transaction is input to the ATM via a keypad on the ATM.

3. The computer-implemented method of claim 1, wherein the PIN associated with the transaction is input via an application on a mobile computing device and communicated from the mobile computing device to the ATM.

4. The computer-implemented method of claim 3, wherein the PIN associated with the transaction is communicated from the mobile computing device to the ATM via a code that is displayed by the mobile computing device and scanned by a camera in the ATM.

5. The computer-implemented method of claim 1, wherein:

the PIN associated with the transaction matches the at least one false PIN associated with the user; and the causing the ATM to exhibit the simulated error comprises: causing the ATM to display a message that indicates a network error.

6. The computer-implemented method of claim 1, wherein:

the PIN associated with the transaction matches the at least one false PIN associated with the user; and the causing the ATM to exhibit the simulated error comprises: causing the ATM to display a message that indicates a system crash of an operating system of the ATM.

7. The computer-implemented method of claim 1, wherein:

the PIN associated with the transaction matches the at least one false PIN associated with the user; and the causing the ATM to exhibit the simulated error comprises: causing the ATM to emit a noise that simulates the ATM counting money; and causing the ATM to simulate a loss of power and a reboot of the ATM.

8. The computer-implemented method of claim 1, wherein:

the PIN associated with the transaction matches the at least one false PIN associated with the user; and the causing the ATM to exhibit the simulated error comprises: causing the ATM to emit a noise that simulates the ATM counting money; and causing the ATM to display a message that indicates a money dispensing system of the ATM is malfunctioning.

9. The computer-implemented method of claim 1, wherein:

the PIN associated with the transaction matches the at least one false PIN associated with the user; and the causing the ATM to exhibit the simulated error comprises: causing the ATM to display a message that indicates an account associated with the user is frozen and suggesting the user contact their bank.

10. The computer-implemented method of claim 1, wherein:

the PIN associated with the transaction matches the at least one false PIN associated with the user; and the causing the ATM to exhibit the simulated error comprises: causing the ATM to display a message that indicates the ATM does not have sufficient cash to complete the transaction.

11. The computer-implemented method of claim 1, wherein:

the PIN associated with the transaction matches the at least one false PIN associated with the user;

the transaction is a first type of transaction involving an account associated with the user; and the computer-implemented method further comprises temporarily disabling a second type of transaction involving the account associated with the user, the second type of transaction being different than the first type of transaction.

12. The computer-implemented method of claim 1, wherein:

the at least one false PIN associated with the user comprises plural different false PINs associated with the user;

the plural different false PINs associated with the user are associated with respective ones of plural different simulated errors; and the causing the ATM to exhibit the simulated error comprises causing the ATM to exhibit a particular one of the plural different simulated errors based on the PIN associated with the transaction matching a particular one of the plural different false PINs.

13. A computer program product comprising one or more computer readable storage media having program instructions collectively stored on the one or more computer readable storage media, the program instructions executable to:

receive input from a user, the input defining a true personal identification number (PIN) associated with the user and plural different false PINs associated with the user, wherein respective ones of the plural different false PINs associated with the user are associated with respective ones of plural different simulated errors;

in response to the user initiating a transaction at an automated teller machine (ATM), determine that a PIN associated with the transaction matches a particular one of the plural different false PINs associated with the user; and cause the ATM to exhibit a particular one of the plural different simulated errors based on the PIN associated with the transaction matching the particular one of the plural different false PINs associated with the user.

14. The computer program product of claim 13, wherein:

the causing the ATM to exhibit the particular one of the plural different simulated errors comprises one of:

causing the ATM to display a message that indicates a network error;

causing the ATM to display a message that indicates a system crash;

causing the ATM to simulate a mechanical malfunction;

causing the ATM to display a message that indicates an error with an account associated with the user; or causing the ATM to display a message that indicates a cash availability error associated with the ATM.

15. The computer program product of claim 13, wherein the PIN associated with the transaction is received by the ATM from a mobile computing device.

16. A system comprising:

a processor, one or more computer readable storage media, and program instructions collectively stored on the one or more computer readable storage media, the program instructions executable to:

receive input from a user, the input defining a true personal identification number (PIN) associated with the user and at least one false PIN associated with the user;

in response to the user initiating a transaction at an automated teller machine (ATM), determine a PIN associated with the transaction matches the at least one false PIN associated with the user; and based on the determining, cause the ATM to exhibit a simulated error that prevents the transaction and perform one or more security actions in addition to causing the ATM to exhibit the simulated error, wherein the performing one or more security actions comprises one or more of:

wherein the transaction is a first type of transaction involving an account associated with the user, temporarily disabling a second type of transaction involving the account associated with the user, the second type of transaction being different than the first type of transaction; or determining a location of the user from a mobile computing device associated with the user, and reporting the location of the user to a predefined contact.

17. The system of claim 16, wherein the causing the ATM to exhibit the simulated error comprises one of:

causing the ATM to display a message that indicates a network error;

causing the ATM to display a message that indicates a system crash;

causing the ATM to simulate a mechanical malfunction;

causing the ATM to display a message that indicates an error with an account associated with the user; or causing the ATM to display a message that indicates a cash availability error associated with the ATM.

* * * * *